Patented June 8, 1948

2,442,884

UNITED STATES PATENT OFFICE 2,442,884

MANUFACTURE OF SPHERICAL PARTICLES

Glenn M. Webb and Reno W. Moehl, Riverside, Ill., assignors to Universal Oil Products Company, Chicago, Ill., a corporation of Delaware No Drawing. Application June 29, 1944, Serial No. 542,830

6 Claims. (Cl. 252—317)

This application is a continuation-in-part of our copending application Serial No. 516,392 filed December 31, 1943 (now abandoned).

This invention relates to an improved method of manufacturing spherical particles and is more specifically concerned with an improved method of manufacture of active catalytic materials in spherical form useful in accelerating and directing hydrocarbon conversion reactions. In recent years, considerable interest has been shown in the manufacture of catalyst particles as spheres, primarily because of the advantages inherent in this type of physical form. Previously it has been the practice to form catalysts in irregular shapes or powders, and then by further processing convert the irregular shapes or powders into spheres. The present invention is related to a method of forming spherical shapes directly from the raw materials, thereby obviating any necessity of further processing insofar as shaping the catalyst particles is concerned. The elimination of the intermediate processing steps decreases to a considerable extent the cost of the catalyst preparation and eliminates many of the operating difficulties heretofore encountered in the manufacture.

The advantages inherent in the spherical shape of the catalyst particle permits the most efficient utilization of the catalyst. One advantage which is particularly important and especially in operations wherein the catalyst is employed in fixed bed relationship to the hydrocarbon reactants is the fact that spherical shapes provide a means of obtaining uniform packing throughout the catalyst bed, thus preventing a variation in pressure drop through the bed. If variations in pressure drop occur, channeling results and a large portion of the catalyst bed is by-passed, thereby decreasing the effective utilization of the catalyst within the bed.

Another advantage of spherical-shaped particles over other physical shapes is the fact that there are no sharp edges present which may break off or wear off during the processing to form fines which would be carried out of the reaction zone causing plugging of subsequent equipment or require separation from the reaction products. This is particularly true in operations where finely divided catalyst particles are employed. The formation of fines or dust increases the catalyst losses and as a result increases the cost of the operation. One of the difficulties encountered in the formation of spherical particles directed from the raw materials, that is, the formation of a hydrogel in a spherical shape from a sol of a compound capable of forming a gel such as compounds of silicon, titanium, zirconium, thorium, cerium or aluminum, is the large loss of catalyst particles by shattering during the subsequent drying and calcining operations. This shattering results from internal stresses within the spherical particles produced when the sol sets into a firm hydrogel.

It is an object of this invention to provide a means for relieving the internal stresses created during the set-up of the sol to a hydrogel, thereby forming hard, strong, spherical particles during the drying and calcining operation while maintaining the breakage as a result of shattering at a minimum.

In one broad embodiment the present invention comprises a process for manufacturing spherical shaped particles which comprises forming a sol of at least one difficultly reducible oxide capable of forming a gel, passing the sol in the form of droplets into a fluid medium, regulating the pH of the sol and the suspension time of the droplets in a fluid medium so that the droplets set within said suspension medium to a firm hydrogel having a spherical shape and aging said spherical shapes in an acidic medium prior to drying of the hydrogel.

A feature of the present invention comprises subjecting the formed spheres of hydrogel to an aging treatment prior to the drying and calcination operations. This aging treatment is accomplished by subjecting the spheres to contact with an acidic medium, either vaporous or liquid, for a predetermined period of time to "anneal" the spheres, that is, relieve the internal stresses created during the setting up of the sol into a hydrogel. Dilute solutions of acids either mineral or organic but preferably the latter may be used for this so-called "annealing" operation. Organic acids such as acetic, formic and oxalic acid have been found to be very satisfactory for this purpose.

The aging time will, of course, be somewhat dependent upon the time of set employed in forming the spheres of the hydrogel, lower aging times being used when longer set times are employed. Satisfactory spheres have been produced when employing aging times within the range of about 2 to about 24 hours or more for hydrogels having setting times ranging from about 6 seconds to about 15 minutes.

For single component spherical particles the aging treatment may be employed following the formation of the spheres of hydrogel prior to the drying and calcining operations. With composites containing two or more components, wherein at least one of the components is incorporated therein after the formation of the spheres, it is preferable that the aging treatment be employed following the incorporation step. In some instances it has been found beneficial to age both before and after the incorporation step.

Catalyst composites formed by impregnating the spheres with a solution of a compound of the other component, and the precipitation therein of said compound followed by the aging treatment have produced very satisfactory particles.

The term "suspension time" as used herein is intended to refer to the time of residence of each individual droplet as such in the suspending medium such as, for example, the time of settling of a droplet in a liquid suspending medium of lower density than that of the droplet, or the time of upward travel of a droplet in a liquid suspending medium of higher density than that of the droplet, or the time of travel of a droplet in any desired direction in a gaseous suspending medium or the residence time of a droplet in an emulsion in a setting zone.

The present invention may be employed in the manufacture of catalyst composites which are useful in promoting such hydrocarbon conversion reactions as catalytic cracking, catalytic reforming, catalytic dehydrogenation of normally liquid or gaseous hydrocarbons, hydrogen transfer reaction, alkyl transfer reactions, olefin isomerization and similar conversion reactions.

The sols may be formed from compounds of silicon, titanium, zirconium, thorium, cerium or aluminum. In preparing catalyst composites from sols of compounds of the above-mentioned elements, the other catalytically active compound may be introduced into the sol prior to the formation of the spherical particles or by impregnating the wet or dry spheres with a solution of the compound. For example, in the production of a catalyst effective in dehydrogenation or hydroforming reactions comprising a composite of alumina with an oxide of an element selected from the group consisting of molybdenum, chromium or vanadium, a compound of one of the above metals such as ammonium molybdate which is soluble in either an acid or basic solution, is added to the alumina sol, the pH of the sol is adjusted to the proper value for the desired setting time and droplets of the sol are passed through a fluid suspending medium forming spheres of a hydrogel having the desired concentration of alumina and other catalytically active compound during said passage through the fluid suspending medium. The spherical particles are then subjected to aging, washing and heating treatment to produce the desired composite.

In some instances it may be more feasible to produce the composite catalyst by impregnating the formed sphere with a solution of the other catalytically active compound desired in the catalyst. This impregnation step may be employed when the catalyst particles are in the form of a hydrogel prior or subsequent to the aging step or after the original spheres of hydrogel have been aged and dried producing hard, glassy bead-like spheres. For example, in the manufacture of a cracking catalyst comprising silica and alumina, the spheres of silica may be formed from a silica sol, washed, aged in acidic solution and dried to form hard, glassy spheres which are subsequently impregnated with a solution of an aluminum compound such as aluminum nitrate, aluminum sulphate, aluminum chloride and the like, and again heated to produce the final catalyst composite. The alumina may be composited with the silica by hydrolytic absorption or by precipitation thereon by the addition of a basic precipitant. On the other hand, the alumina may be incorporated in the spheres and the composite aged in acidic solution prior to the drying and heating steps.

The composite catalyst may be composed of more than two compounds, the additional compounds being incorporated in the catalyst in a manner similar to those described above. Typical three component catalysts comprise alumina-chromium oxide or alumina-molybdenum oxide dehydrogenating catalysts to which small amounts of magnesia have been added to improve their heat stability. Silica-alumina cracking catalysts containing small amounts of zirconia, thoria or boron oxide are other typical examples.

The spherical shaped particles may be formed in a variety of ways from a sol which has the correct concentration, the proper pH and which will set up to a firm gel in a matter of a few seconds or minutes. This sol is introduced in the form of droplets into the body of an inert fluid, for example, an organic liquid such as kerosene, Nujol oil and similar materials which allow the droplets to settle at a rate such that the sol is set into a hydrogel during its passage through the body of inert fluid. Instead of kerosene or materials having a density less than the droplet of the sol, materials having a higher density may be used with the droplets being introduced at the bottom of a confined body of the fluid so that they rise slowly to the surface of the body, setting into a hydrogel during the passage through the fluid.

The rate of travel of the particles through the liquid suspending medium will be dependent primarily on the density and size of the droplets of sol and the density and viscosity of the liquid suspending medium.

The viscosity of the suspending liquid is an important factor in the production of satisfactory spheres. If the viscosity is too high the liquid droplets of the sol will fail to penetrate the surface of the suspending liquid. This results in a collection of drops on the surface of the suspending liquid which are liable to coalesce before the mass of material is heavy enough to break through. Under these circumstances, the size and even the shape of the particles can not be regulated.

Alternatively the spherical bodies may be formed by spraying the sol of controlled pH into air, the pH being regulated so that a comparatively short set-up time is obtained so that firm particles of hydrogel are obtained during the passage of the sol through the air. The sol having the correct pH may also be sprayed into a rising stream of air, the velocity of said stream being sufficient to produce a hindered settling action which provides sufficient time for the setting of the sol into spheres of firm hydrogel. The particles sprayed into the air may fall into a moving stream of liquid which will carry the spherical hydrogel particles out of the forming zone.

Still another method of forming the spherical shapes consists of producing an emulsion of the sol and an immiscible liquid. This emulsion must be of the type which gives droplets of sol in the immiscible liquid such as, for example, a hydrocarbon liquid. For example, a mixture of sol and kerosene or sol and carbon tetrachloride diluted with a hydrocarbon to make a specific gravity close to 1 may be used. An emulsification agent such as resin or pitch may be added to stabilize the emulsion of the sol in the hydrocarbon. The size of the sol particles is controlled by the rate and time of agitation. If the original sol mixture is sufficiently close to its set point, the emulsion may be permitted to stand until the sol droplets have solidified and can be removed from the emulsion. If the original sol is such that it will take considerable time to set up, the emulsion may be heated to shorten the setting time. The most satisfactory catalyst particles are obtained when the gel is permitted to age in the emulsion after setting up to gain strength. This method of operation is particularly adaptable to the production of spherical particles of relatively small size.

Silica sols may be obtained, for example, by hydrolysis of silicates such as ethyl orthosilicate or from concentrated solutions of more siliceous alkali metal silicates particularly sodium silicates which are ordinarily called "water glasses." The hydrolysis may be obtained by adding a small amount of acid to the silicate.

Alumina sols can be easily prepared by the addition of aluminum amalgam to water or by precipitating hydrated alumina from aluminum salts such as aluminum nitrate, aluminum sulphate and the like, by the addition of a basic precipitant, washing the precipitates and redissolving the precipitate in weakly ionized acids such as acetic or formic acid. In forming silica-alumina composites, the salts of these materials may be combined prior to the formation of the droplets and the sols set into a hydrogel containing the desired amounts of silica and alumina.

In the formation of the sol, there are various factors which must be taken into consideration to insure the production of satisfactory catalyst particles. The most important factor is the setting time of the sol into a firm hydrogel since this setting of the sol must be accomplished in the comparatively short time of travel of the droplets of the sol through the fluid suspending medium. The length of setting time is primarily dependent upon the pH of the sol. This pH must be carefully regulated and correlated with the settling time of the droplets within the fluid suspending medium so that upon the completion of the travel of the droplets through the suspending medium, they have set up into a firm hydrogel retaining the spherical shape assumed during the passage through said medium. Other factors which exert a noticeable effect on the setting time of the sol are the concentration of the difficultly reducible oxide in the sol and the temperature of the sol and fluid medium.

It is, of course, evident that the desired ranges of these factors are dependent upon the particular sol being employed. When dealing with silica sols obtained from alkali metal silicates such as water glasses having a concentration of $SiO_2$ of from about 3 to about 10 weight percent, the pH should be controlled within the range of about 6 to about 10 giving a setting time within the range of about ⅛ to 10 minutes.

If the silica sol is derived from other silicates, for example, ethylorthosilicate, the desired pH will be of the order of about 4.3 to about 7.

The following examples illustrate in a general way the improved results obtainable when employing the herein disclosed method of manufacturing the spherical particles. However, it is not intended that these examples limit the invention to the specific conditions and method of operation herein described.

EXAMPLE I

A silica-alumina cracking catalyst was prepared by the following procedure. A filtered water glass solution was mixed with hydrochloric acid to form a silica sol having a pH of about 8. The concentration of silica in said sol was about 5 weight percent $SiO_2$. Droplets of the sol were introduced into a vessel containing kerosene. The depth of the liquid being approximately 4 feet. The droplets slowly passed downwardly through the kerosene setting into spheres of a firm silisa hydrogel during the passage therethrough. The spheres were removed from the bottom of the vessel and immersed in a solution of aluminum sulphate. After about one hour the excess solution was drained off, the spheres flushed lightly with water and then submerged for one hour in an ammonium hydroxide solution. The ammonium hydroxide solution was drained off and the spheres purified by washing with a weak solution of sulfuric acid (pH of about 3). This purification step was employed to reduce the soda content of the catalyst since it has been found that the presence of even small amounts of soda tend to decrease the thermal stability of the composite satalyst. The purified spheres were removed from the washer and immersed in a solution of about 5% acetic acid for a period of about 4 hours. Following this treatment the catalyst was washed lightly with purified water, spread out in drying trays and dried by infra red radiation for about 6 hours. As the final step in the manufacture the dried spheres were calcined at about 600° C. for about 6 hours. About 80% of the catalyst spheres retained their spherical shape during the drying and calcining operation. The loss of catalyst due to disintegration was comparatively minor. This silica-alumina catalyst was then placed into a reaction chamber and contacted with a gas oil having an A. P. I. gravity of 35.6 at a temperature of about 510° C. and a space velocity of about 1.9 under atmospheric pressure. The reaction products contained about 34 volume percent of gasoline having an end point of about 205° C. and an A. S. T. M. octane number of 80.

EXAMPLE II

A second batch of catalyst was prepared using the same procedure as used in Example I with the exception that the treatment with a dilute acetic acid solution was omitted. Upon drying these catalyst spheres considerable disintegration resulted and the recovery of spherical particles amounted to only about 20% of those originally charged to the drying step. When this catalyst was used for cracking the same charging stock as employed in Example I, slightly inferior results were obtained. The yield of 205° C. was about 33.2 and the A. S. T. M. octane number was 79.2.

It is apparent from the above examples that the step consisting of immersing the spherical particles of the composite in an acid silution exerts a considerable effect upon the amount of disintegration which occurs during the drying and calcining of the spherical particles. The actual recovery of spherical particles is four times as great, or stated differently, an actual increase of 300%. This improved recovery is, of course, tremendously important in the commercial manufacture of spherical particles.

In Table I below are shown the setting times obtained when employing a silica sol obtained from ethylorthosilicate with variations in pH.

Table I

| pH | Setting Time |
| --- | --- |
| 3.07 | Over 180 minutes. |
| 4.30 | 13 minutes. |
| 5.20 | 11 minutes. |
| 5.40 | 4.5 minutes. |
| 5.50 | 4.25 minutes. |
| 5.70 | 1.25 minutes. |
| 5.90 | 1.12 minutes. |
| 6.10 | 52 seconds. |
| 6.20 | 37 seconds. |
| 7.0 | Less than 12 seconds. |

It is apparent from the above table that the setting time of sols having a pH below about 4.3 is too long for such sols to be employed satisfactorily in the process of manufacture herein described.

The variation of setting time with variations of pH of a silica sol obtained from a sodium silicate solution are given below in Table II.

Table II

| pH | Setting Time |
| --- | --- |
|  | Minutes |
| 9.6 | 7.0 |
| 8.9 | 1.5 |
| 8.7 | 1.2 |
| 8.4 | 1.0 |
| 7.8 | 0.5 |
| 7.1 | 0.8 |
| 6.9 | 1.5 |
| 6.4 | 3.6 |
| 6.0 | 8.0 |
| 5.7 | 21.0 |

We claim as our invention:

1. A process for the production of spherical gel particles which comprises introducing to a fluid suspending medium droplets of a sol of a difficultly reducible oxide and therein causing the droplets to set to hydrogel spheres, aging said hydrogel spheres in contact with a dilute acid solution for at least two hours to reduce breakage thereof during subsequent heating, and thereafter drying the spheres by heating thereof.

2. A process for the production of spherical gel particles which comprises introducing to a fluid suspending medium droplets of a sol of a difficultly reducible oxide and therein causing the droplets to set to hydrogel spheres, aging said hydrogel spheres in contact with a dilute solution of an organic acid for at least two hours to reduce breakage thereof during subsequent heating, and thereafter drying the spheres by heating thereof.

3. The process as defined in claim 2 further characterized in that said organic acid is acetic acid.

4. A process for the production of spherical gel particles which comprises introducing droplets of a silica hydrosol into a fluid suspending medium and therein causing the droplets to set to silica hydrogel spheres, aging said hydrogel spheres in contact with a dilute acid solution for at least two hours to reduce breakage thereof during subsequent heating, and thereafter drying the spheres by heating thereof.

5. The process as defined in claim 4 further characterized in that said solution comprises an organic acid.

6. The process as defined in claim 4 further characterized in that said solution comprises acetic acid.

GLENN M. WEBB.
RENO W. MOEHL.

REFERENCES CITED

The following references are of record in the file of this patent:

UNITED STATES PATENTS

| Number | Name | Date |
| --- | --- | --- |
| 1,614,636 | Wachtel | Jan. 18, 1927 |
| 1,748,315 | Stoewener | Feb. 25, 1930 |
| 1,755,496 | Behrman | Apr. 22, 1930 |
| 1,783,304 | Okatoff | Dec. 2, 1930 |
| 1,819,354 | Behrman | Aug. 18, 1931 |
| 1,819,356 | Church | Aug. 18, 1931 |
| 1,843,576 | Mc Clure | Feb. 2, 1932 |
| 2,229,353 | Thomas | Jan. 21, 1941 |
| 2,232,727 | Peterkin et al. | Feb. 25, 1941 |
| 2,284,248 | Baker | May 26, 1942 |
| 2,285,396 | Danforth | June 9, 1942 |
| 2,326,523 | Connolly | Aug. 10, 1943 |
| 2,328,773 | Benedict | Sept. 7, 1943 |
| 2,356,303 | Connolly | Aug. 22, 1944 |
| 2,385,217 | Marisic | Sept. 18, 1945 |